UNITED STATES PATENT OFFICE.

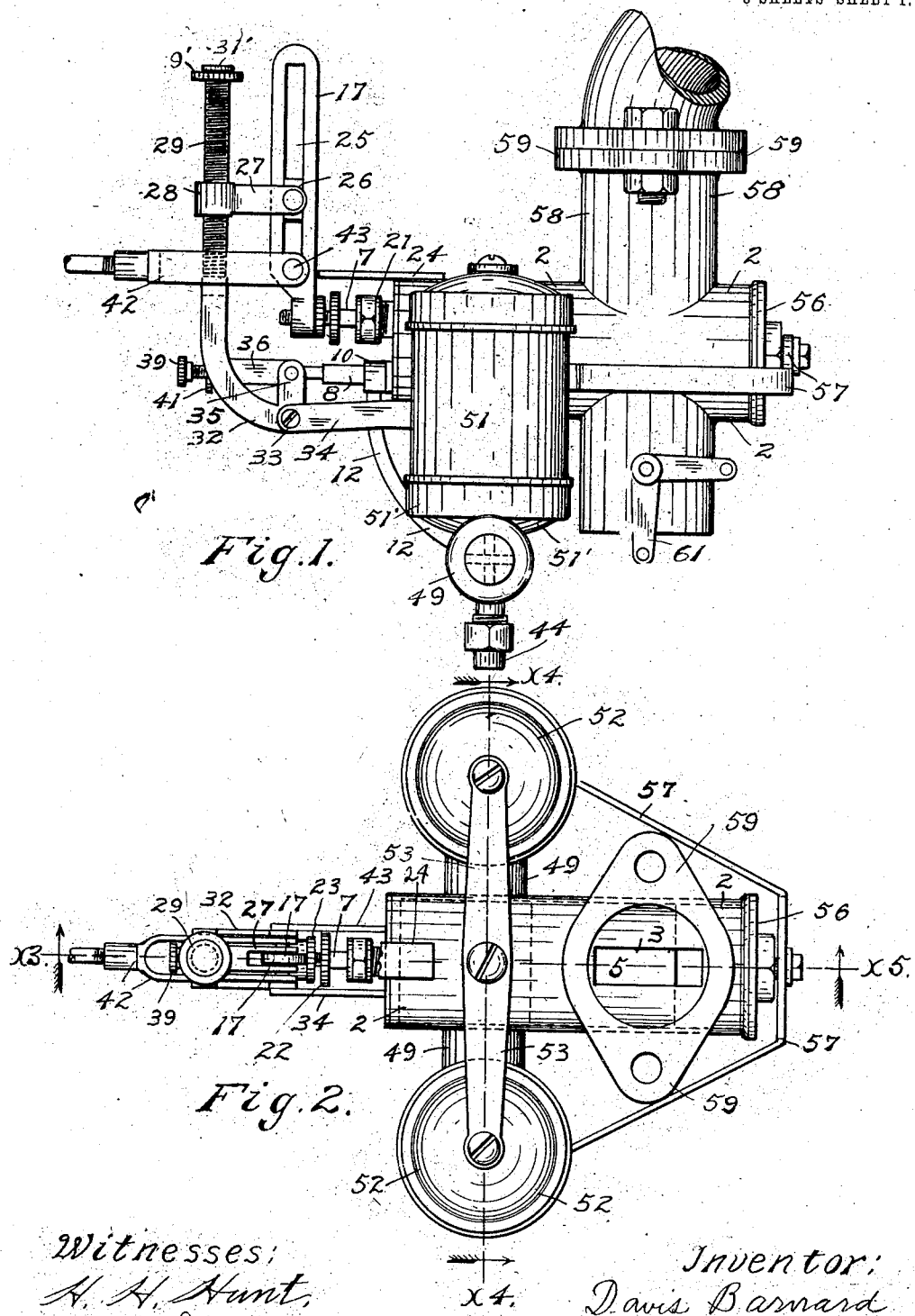

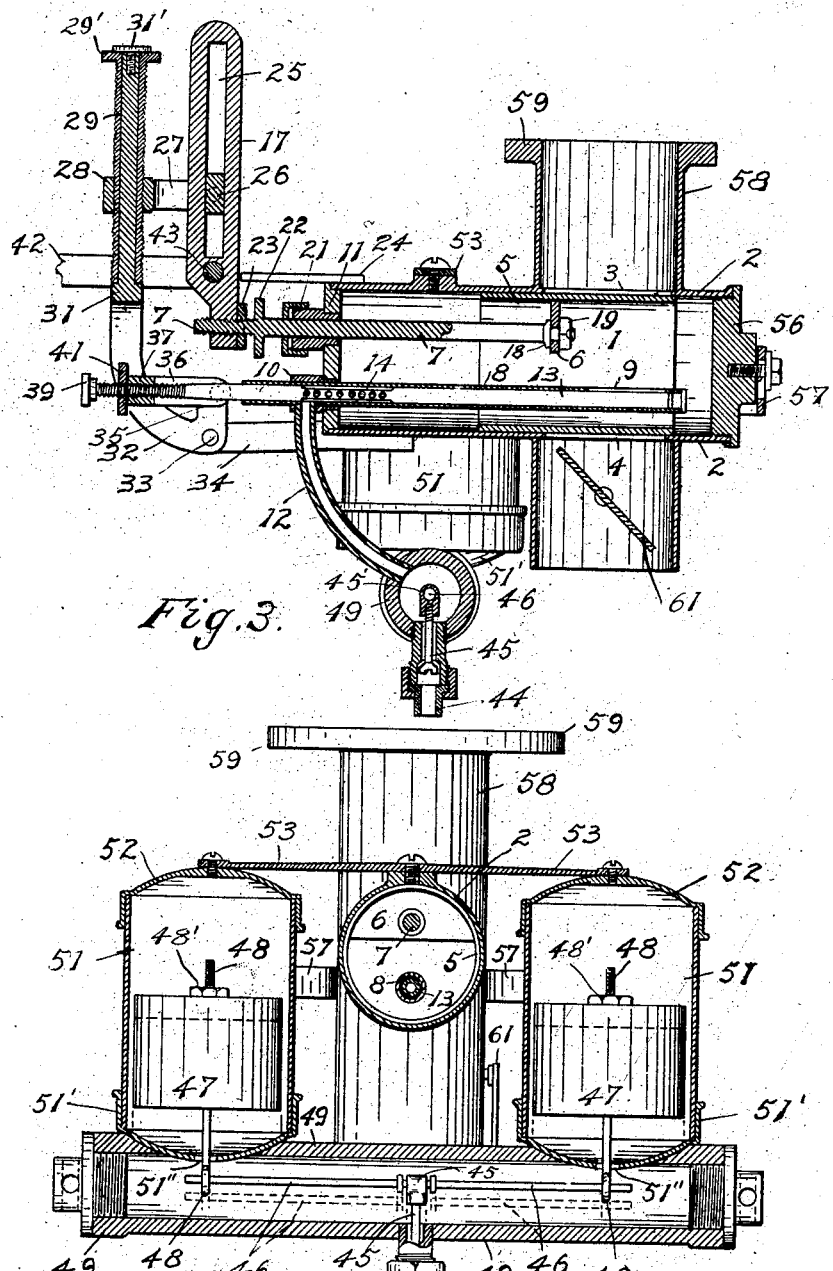

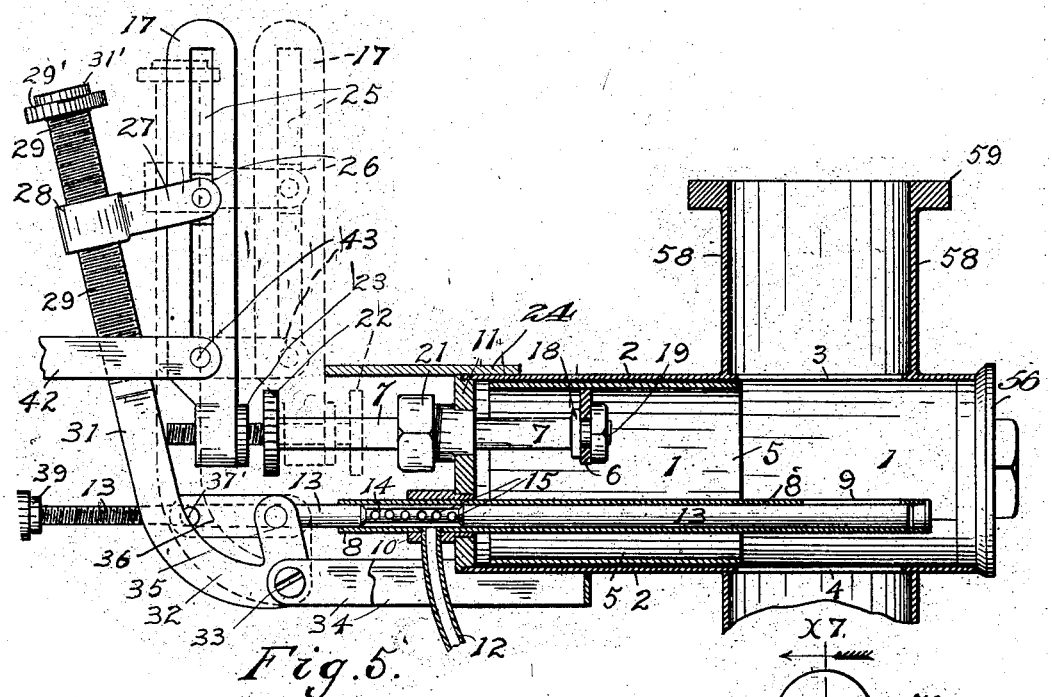
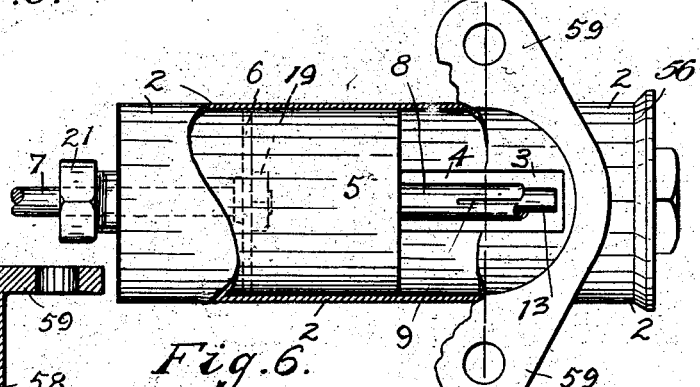
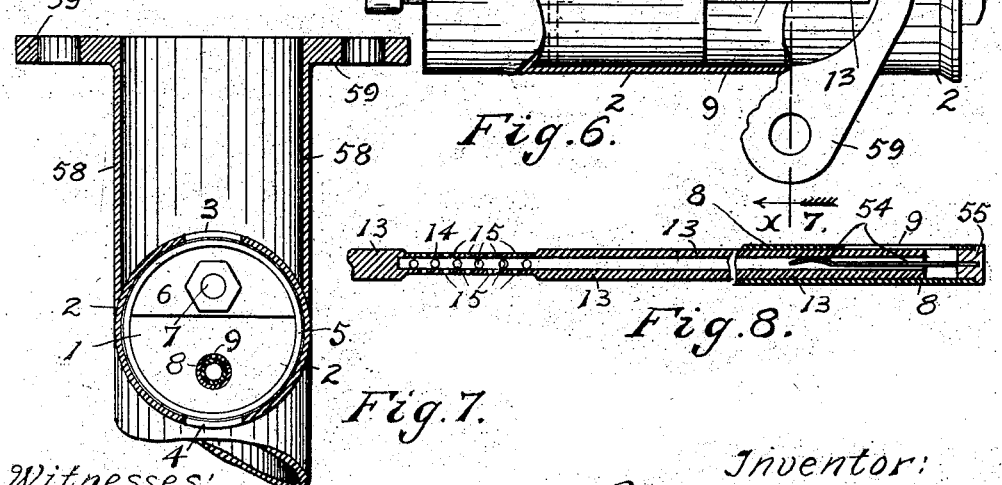

DAVIS BARNARD, OF LOS ANGELES, CALIFORNIA.

CARBURETER.

1,027,459.  Specification of Letters Patent.  Patented May 28, 1912.

Application filed September 9, 1910. Serial No. 581,242.

*To all whom it may concern:*

Be it known that I, DAVIS BARNARD, a citizen of the United States, residing at Los Angeles, California, have invented a new and useful Carbureter, of which the following is a specification.

Among the objects of this invention are to provide a carbureter that will supply vaporized liquid fuel to gas engines in a more economical manner and in a more uniform and perfect manner than is done by other devices of its class.

The invention accomplishes the economical and efficient feeding of fuel to the engine by means of an arrangement whereby the air fed to the engine is always saturated with vapor to the same extent and in required exact proportions, the regulation of the amount of fuel supplied to the engine being accomplished solely by increasing and diminishing the volume of the saturated air fed to the engine and not by varying the degree of saturation, that is to say, each cubic inch of air drawn into the engine is always saturated with the same per cent. of fuel after the carbureter has been adjusted and the engine put into operation, but a greater or less number of cubic inches of air are drawn into the cylinder for each charge according to the demands of the engine.

The carbureter is constructed to enlarge the fuel feed and simultaneously enlarge the draft openings, one on each side of the spraying opening, the effect of which is to produce exactly the vacuum desired on the fuel orifice.

The invention consists in the various parts, combinations, and details of construction hereinafter described in connection with the accompanying drawings and then definitely point out in generic and also in more specific claims.

Referring to the accompanying drawings which illustrate the invention, Figure 1 is a side elevation of the complete carbureter showing also a fragment of the means for operating the same and a portion of the feed pipe of the engine to which the carbureter is attached. Fig. 2 is a top plan view of Fig. 1 the fragment of the engine intake pipe being omitted. Fig. 3 is a mid-section on line $X^5$—$X^5$ of Fig. 2. Fig. 4 is a cross section on line $X^4$—$X^4$ of Fig. 2. Fig. 4ª is an enlarged sectional detail of a portion of Fig. 4. Fig. 5 is a reproduction of the upper portion of Fig. 3 on an enlarged scale showing the operative parts in another position. Fig. 6 is a top plan view partly in section of the carbureter chamber a portion of which is broken away to show interior construction. Fig. 7 is a cross section of Fig. 6 on line $X^7$—$X^7$ thereof. Fig. 8 is an enlarged longitudinal section of the fuel feeding plunger broken to contract the view.

Referring in detail to the drawings, the carbureter chamber 1 is inclosed by the carbureting cylinder 2, said cylinder being provided in its upper side with a carbureted air supply opening 3 and in its lower side with an air inlet opening 4. Said openings 3 and 4 (see Fig. 7) are in the form of slots extending langthwise of the cylinder 2 and are opened and closed at any desired extent by means of a piston sleeve 5 having a partial cross wall 6 by which said piston sleeve is operated by means of the piston rod 7.

Within the carbureting chamber 1 is a liquid supply tube 8 having in its upper side a supply slot or narrow slit 9 located between the openings 3 and 4. Said tube 8 projects through a head 11 which closes one end of the carbureting chamber 1, and outside of said chamber said tube is provided with a liquid inlet pipe 12, said tube 8 extending a little distance to the left of the point where the supply pipe 12 communicates therewith. Within the tube 8 is a hollow plunger 13 (see Fig. 8) which extends from end to end thereof and is provided with a reduced portion 14 always opposite the fuel supply pipe 12. Said reduced portion 14 is provided with a series of inlet holes 15. Plunger 13 is provided with an open inner end but is made solid at its other end where it extends outside of the tube 8. This construction adapts the plunger 13 to conduct the liquid from the supply tube 12 to the slotted end of the tube 8 where the fuel is drawn from the outlet slot 9 in the form of spray by the suction of the engine. The opening of the outlet 9 is regulated by adjusting the position of the plunger 13 within the tube 8 in a manner that will be hereinafter fully explained.

Means will now be described for positively regulating the relative movement between, and thereby harmonize the operation of, the piston rod 7 and the plunger 8. For this purpose an upright guide 17 is secured at its lower end to the outer end of the piston 7 desirably by providing the lower end of the said guide with a threaded bore into which the outer end of the piston rod 7 is screwed. The piston rod 7 is rotatable within the cross wall 6, being provided with a shoulder 18 on one side of said wall and a nut 19 on the other side of said wall 6. 21 is a stuffing box mounted in the head 11 through which rod 7 projects. Said rod 7 is desirably provided with a knurled flange 22 for rotating the same to adjust its position and therefore the position of the piston sleeve 5 carried thereby to simultaneously regulate the width of opening of the slots 3 and 4. When the desired adjustment is obtained, a lock nut 23 is screwed down upon the guide 7 to hold the same in the adjusted position. 24 is a stop arm secured to the top of the cylinder. The adjustable guide 17 is provided with a slot or way 25 within which slides a cross head 26 to which are pivoted the forks 27 carried by a nut 28. Within said nut 28 operates an externally threaded rotatable sleeve 29 carried by a lever 31, which is connected with the plunger 13 to operate the same and regulate the extent of opening of the slot 9.

In order to hold the plunger snugly up against the top of tube 8 to insure the proper closing of slot 9, I provide a leaf spring 54 (see Fig. 8) which is secured in a block 55 that closes the end of tube 8, the free end of said spring at all times extending within the plunger 13 and pressing against the upper wall thereof to hold the same closely to the top of the tube 8.

The right hand end of the carbureter cylinder 2 may be closed by a head 56. A brace 57 is shown, the central portion of which is unitary with or secured to the head 56 and the ends of which brace extend around to and are secured upon the sides of the float chamber 51.

58 is a tube for supplying the mixture to the engine, said tube being desirably furnished with the attaching flange 59.

Lever 31 terminates at its lower end in forks 32, each of said forks being pivoted at 33 to fixed arms 34. Each of said forks 32 are provided with short upwardly extending arms 35 which are pivoted to links 36, the other ends of said links being pivotally connected to the outer end of the plunger 13. Plunger 13 (see Fig. 3) is provided with a head 37 having trunnions 37' (see Fig. 5) journaled into the links 36. The threaded end of the plunger 13 projects through said cross head and is there provided with an operating nut 39 and lock nut 41 by which it is adjusted as desired and then secured in the adjusted position. The levers 17 and 31 are moved as desired by means of a forked rod 42, the forks of which pass astride the guide 17 and are pivoted to the lower portion thereof by means of a pin 43. Said rod 42 leads to any suitable control lever (not shown) for operating the same.

The liquid fuel is supplied through an inlet 44 controlled by a valve 45 which is regulated by a walking beam 46 the ends of said beam being connected to floats 47 by means of eye bolts 48. Said walking beam operates in a cylindrical housing 49. The floats 47 are each located in a float chamber 51 having a cover 52. The bottoms 51' of said float chambers are united in a liquid-tight manner with said housing 49, and are provided with central apertures 51'' through which extends the eye-bolt 48. Valve stem 45 is provided with a head 45' having a bore 45'' (Fig. 4ª) with flared ends to provide for a tilting movement of walking beam 46. 46' are collars fixed to said walking beam on each side of head 45' to keep the walking beam in place. The eye-bolts extend up through the floats 47 and are adjustable by means of nuts 48'. A brace 53 may be secured at each end to one of the caps 52 and may be fastened down between its ends to the top of the carbureter cylinder 2 as shown.

The usual choker 61 may be provided to regulate the air intake.

Sleeve 29 is provided with a milled head 29' for rotating the same. Said sleeve may be held on to lever 31 by a screw 31' (Fig. 3) in the end of said lever.

Owing to the fact that engines differ both in respect to length of stroke and also in respect to size of bore it is necessary to provide means of adjustment that will furnish a greater or less amount of properly carbureted air for each charge. It is necessary first to adjust properly for the minimum or low speed of the engine when the same is running without load. In order to do this, with the operating rod 42 in the right hand position, and the guide 17 abutting against the stop arm 24, the pivot in guide block 26 is brought vertically above stationary pivot 33 and the piston rod 7 is then rotated by means of flange 22 in a direction to draw back the cylindrical piston sleeve 5. To open the slots 3 and 4 a suitable distance, say one-fourth of an inch, to supply the proper volume of carbureted air to the engine when running without load, plunger 13 is now rotated by means of the milled head on the end thereof until said plunger is withdrawn sufficiently to expose the required length of fuel supply slot 9 necessary to properly carburet the quantity of air which will be fed to the engine through the air feeding openings when the same have been opened to the extent already described. The rod 42 is now manually moved to the left until it and the adjusting mechanism occupy the position shown in full lines in Fig. 5, and while the parts are in this position the threaded sleeve 29 is rotated to move the forked nut 28 together with the block 26 in guide 17 up or down until the lever 31 is connected with the guide 17 in such a manner that the moving of said guide a given amount will afford a proper proportional movement of the lever. It will be observed that making the adjustment last described will in no wise affect the adjustment of the air openings and fuel supply slot when they are in the original position. An adjustment is made for the engine when running at the minimum speed to at that time mix the fuel and air in proper proportions, and another adjustment is made for the engine when running at maximum speed to at that time mix the fuel and air in proper proportions and the result is that neither of the adjustments interferes with the other, and the exact desired ratio of fuel to air is maintained at all intermediate positions of the levers and parts connected therewith.

Owing to the draft slots 3 and 4 being of uniform width throughout their entire length and the fuel feeding slot 9 also being of uniform width, it is easy to accomplish a proper preliminary adjustment of the minimum feed, and also readily to make the adjustment required for running under full load. I have found it necessary to devise means for doing away with the ordinary needle-controlled tapering feed opening, and to provide instead the feed slot 9 of uniform width before any satisfactory adjustment could be effected. The combination of a fuel feed having a feed slot of uniform width with like slots for the air draft, and means movable lengthwise of all these slots to control the openings thereof, constitutes one of the main features of this invention.

When the device is in the retracted position shown in Fig. 1 and the lever 32 and sleeve 29 in the upright position and parallel to each other, the vertical adjustment of the fork 28 and block 26 do not affect the relative position of the parts in supplying the smallest amount of fuel, the operating rod 42 is retracted a given amount and the rod 7 and plunger 13 moved with it a certain extent, if said operating rod were moved twice said given amount the same proportions of movement would still be maintained between the rod 7 and hollow plunger. The swing of the lever 31 on its fulcrum 33, if made twice as great will give twice the movement to the hollow plunger and at the same time the direct outward movement of the piston rod 7 will be twice as much.

I claim:

1. In a carbureter, a carbureting chamber or casing having an air opening through a wall thereof, said opening being of uniform width throughout its length, slidable closure means fitting over said opening, a rod to move said closure means to regulate the size of said opening, means adapted to be set to limit the closing movement of said rod, a pivoted lever, means connecting said lever and rod adjustably at different distances from the pivot of said lever, a fuel feed nozzle within said carbureting chamber, means movable lengthwise of said nozzle to open the same at a uniform rate, means operatively connecting said nozzle-opening means with said lever, and means adapted to be set to limit the closing movement of said nozzle-opening means with respect to said lever.

2. In a carbureter, a carbureting chamber having oppositely disposed air openings through the walls thereof, said air openings each being of a uniform width throughout its length, a piston sleeve fitting within said chamber, a rod to move said sleeve to simultaneously regulate the size of said openings, means adapted to be set to limit the closing movement of said sleeve, a pivoted lever, means connecting said lever and rod adjustably at different distances from the pivot of said lever, a fuel feed nozzle between the air openings of the carbureting chamber, a plunger within said nozzle adapted to open the same at a uniform rate per unit of movement of said plunger, means operatively connecting said plunger with said lever, and means adapted to be set to limit the closing movement of said plunger with respect to said lever.

3. In a carbureter, a carbureting chamber or casing having oppositely disposed air openings through the walls thereof, said openings being of a uniform width throughout their length, slidable closure means fitting over said openings, a rod to move said closure means to simultaneously regulate the size of said openings, means adapted to be set to limit the closing movement of said rod, a pivoted lever, means connecting said lever and rod adjustably at different distances from the pivot of said lever, a fuel feed nozzle between the air openings of the carbureting chamber, a plunger within said nozzle adapted to open the same at a uniform rate per unit of movement of said plunger, means operatively connecting said plunger with said lever, and means adapted to be set to limit the closing movement of said plunger with respect to said lever.

In testimony whereof I have hereunto signed my name in the presence of two subscribing witnesses at Los Angeles, in the county of Los Angeles and State of California, this 3rd day of September 1910.

DAVIS BARNARD.

Witnesses:
 ALBERT H. MERRILL,
 LILLIAN YOUNG.